United States Patent [19]

Chen

[11] Patent Number: 5,062,747
[45] Date of Patent: Nov. 5, 1991

[54] JIG-BORING DEVICE

[76] Inventor: Ming-Tang Chen, No. 23-4, Alley 21, Lane 205, Yong Xing Road, Dali, Taichung, Taiwan

[21] Appl. No.: 463,195

[22] Filed: Jan. 10, 1990

[51] Int. Cl.⁵ .............................................. B23B 47/28
[52] U.S. Cl. .................................. 408/115 R; 74/110; 83/821; 408/72 R; 408/112; 33/675
[58] Field of Search ............ 408/115 R, 115 B, 72 R, 408/72 B, 112; 33/673, 675, 667; 74/110; 83/522.18, 522.25, 821, 829; 7/150

[56] References Cited

U.S. PATENT DOCUMENTS

| | | | |
|---|---|---|---|
| 794,170 | 7/1905 | Fessler | 33/675 |
| 1,539,700 | 5/1925 | Stramaglia | 33/675 |
| 1,797,551 | 3/1931 | Heinze | 33/675 X |
| 2,842,860 | 7/1958 | Gray | 33/675 X |
| 3,137,947 | 6/1964 | Flower | 33/675 |
| 3,628,253 | 12/1971 | Shepard | 33/675 X |
| 3,785,060 | 1/1974 | Brewer | 33/675 X |

Primary Examiner—Larry I. Schwartz
Assistant Examiner—Robert Schultz
Attorney, Agent, or Firm—Browdy and Neimark

[57] ABSTRACT

A jig-boring device, comprising an axle barrel which connects with bottom plate and is sheathed with lower gear, fixed support, upper gear and cover plate; a circular bottom plate connected to the bottom of the axle barrel; a lower gear placed on bottom plate sheathing the axle barrel; a fixed mount placed on lower gear sheathing the axle barrel; an upper gear placed on fixed support sheathing the axle barrel; a cover plate placed on upper gear sheathing the axle barrel; a lock nut which screws to the top outer periphery of the axle barrel; two pairs of measuring staffs which connect to two pairs of measuring staff brackets respectively; and two pairs of measuring staff brackets, placed symmetrizing each other on the bottom plate and fixed support respectively, which can measure out the abscissa and vertical coordinate of a desired bore center position about a work object.

3 Claims, 5 Drawing Sheets

JIG-BORING DEVICE

FIELD OF THE INVENTION

This invention relates to a jig-boring device, and more particularly to a device with two pairs of measuring staffs, one pair perpendicularly crossing another, that could be shifted parallelledly to locate a bore center the user searches on his work object to save time and facilitate boring job.

BACKGROUND OF THE INVENTION

To bore a work object, it generally needs to pass the troubles to define a basic plane for work object, according to the bore center's abscissa and vertical coordinate on blueprint, then draw lines for that dimension to uncover the bore center searched on the work object. This method of boring work object is not only much inconvenient but wastes work time.

OBJECTS OF THE INVENTION

This invention aims to solve the above-said problem by providing a jig-boring device of which the features are:

1. As this device is placed on a work object and whose two pairs of measuring staffs are pulled out horizontally and longitudinally all with their ends of rest plates touching the four sides edge of the work object, the center of the axle barrel of this device is proved to be the work object's center position.

2. With this device placed on a work object, it only needs to set a basic plane longitudecinally and horizontally, which may help locate any wished boring center on this work object immediately.

3. In use, this device need not require the user to draw lines onto the work object surface; a driller under guidance of guide plate can help drill out a hole shortly after bore center is uncovered.

SUMMARY OF THE INVENTION

A jig-boring device comprises an axle barrel, a base plate, a lower gear, a fixed support, an upper gear, two pairs of measuring staffs, two pairs of measuring staff brackets, a cover plate and a lock nut. Each gear parallely engages with a pair of measuring staffs in a manner that one parallel pair perpendicularly crosses the other parallel pair. In use, as this device is placed on a work object, pulling one pair to set out a bore center's abscissa and the other pair to set out its vertical coordinate can easily find out a bore center position searched. Afterwards, a driller under guidance of guide plate may help drill out a bore immediately, saving the trouble to draw lines thereon by the user.

BRIEF DESCRIPTION OF THE INVENTION

SPECIFIC DESCRIPTION

Figure 1:
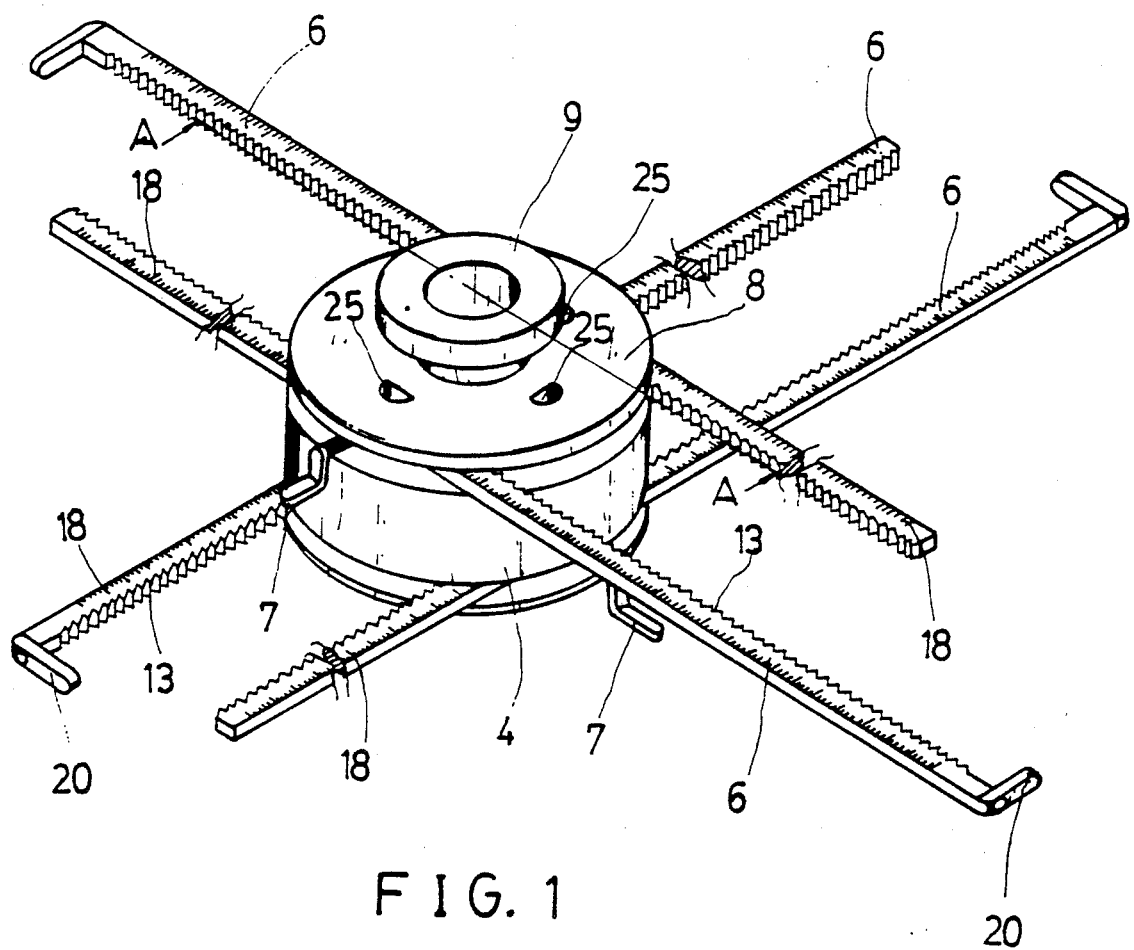
FIG. 1 is an appearance perspective view of a preferred embodiment according to the invention.
Figure 2:
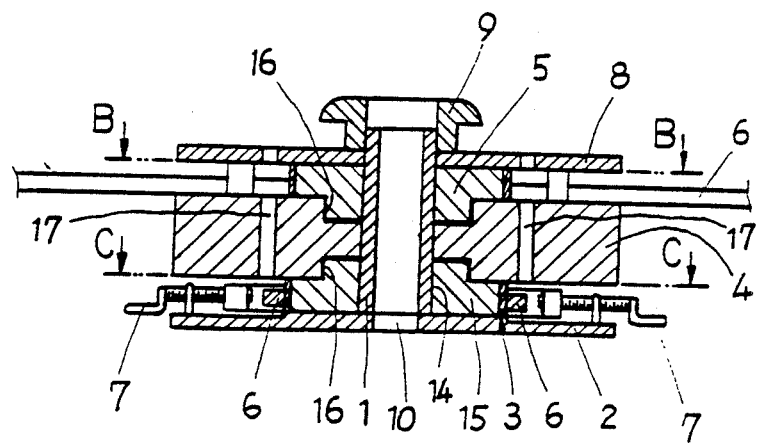
FIG. 2 is a sectional view taken along A—A line in FIG. 1.

As shown in FIGS. 1, 2, this invention comprises: axle barrel 1, base plate 2, lower gear 3, fixed support 4, upper gear 5, measuring staff 6, measuring staff bracket 7, cover plate 8 and lock nut 9. Axle barrel 1 is a small length of a hollow round barrel with the bottom perpendicularly connected with the central opening 10 of base plate 2 and is sheathed with lower gear 3, fixed support 4, upper gear 5 and cover plate 8. The axle barrel's top periphery is provided with male threads for lock nut 9 screwedly to get locked to enable measuring staff 6 positioned when the set lengths about measuring staffs are pulled out.

Figure 3:
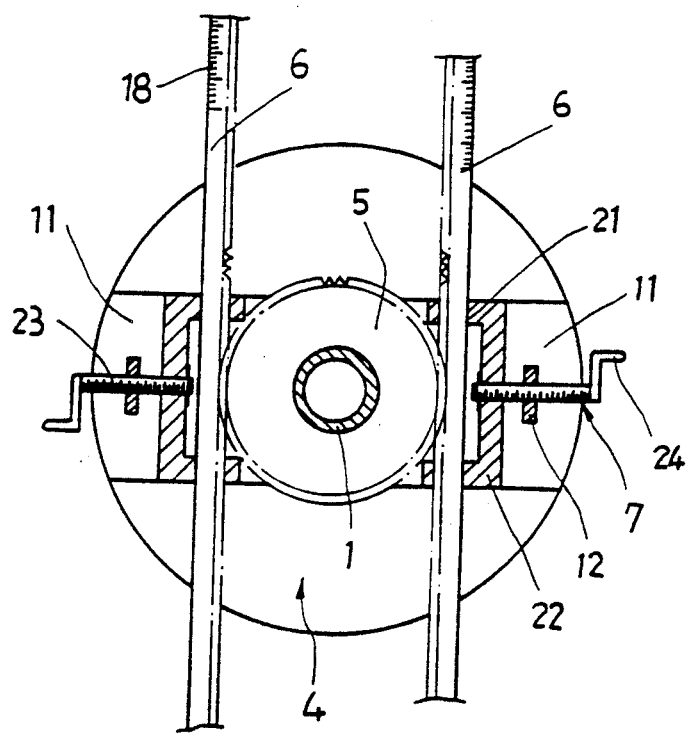
FIG. 3 is a sectional view taken along B—B line in FIG. 2.
Figure 4:
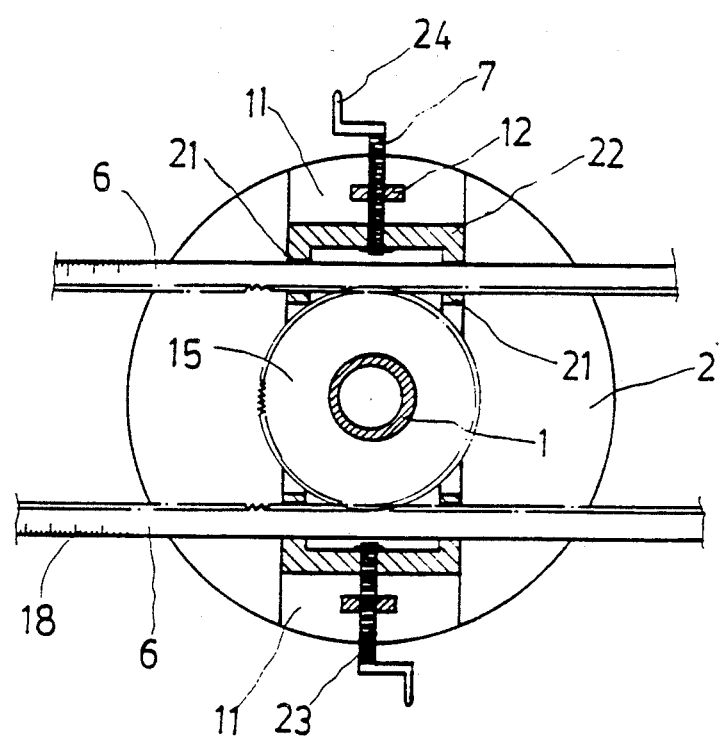
FIG. 4 is a sectional view taken along C—C line in FIG. 2.

As FIG. 4 shows, base plate 2, with central opening 10 for axle barrel 1 to make connection, is a circular plate whose upper surface is provided with a symmetry of guide grooves 11 as well as cross nut pieces 12 to connect with measuring staff bracket 7 and guide it in moving back and forth to make rack rim 13 of measuring staff 6 engage or separate from teeth of lower gear 3. Lower gear 3 is provided of a central opening 14 (as FIG. 2 shows) which in dimension corresponds to the outer diameter of axle barrel 1 so as to sheathe it and get positioned, and could be actuated to turn freely when its teeth is engaged with the rack rim 13 of measuring staff 6; the lower gear upper part is provided of an extended portion 15 which could insert fixed support 4 to get positioned well. The fixed support 4 is a short cylindric block, "fixed" between the lower gear 3 and the upper gear 5, with central opening sheathing axle barrel 1 and is provided of a central concave portion 16 in both its upper and lower surfaces for the extended portion of lower gear 3, or upper gear 5, to insert and be sheathed thereby; outside the upppper concave portion 16, there is too provided a symmetry of guides grooves 11 as well as cross nut pieces 12 (as FIG. 3 shows) to connect with another pair of measuring staff bracket 7. And there is provided vision hole 17 (as FIG. 2 shows) for observing scales on measuring staff 6. Upper gear 5 and lower gear 3 are just all the same in structure but sheathe axle barrel 1 contrarily to engage with another pair of measuring staffs 6.

As FIGS. 3, 4 show, this invention has two pairs of measuring staffs 6 whose structures are all the same totally. Each is a vertical rack proper long in rectangular or square shape, to whose upper surface outward side there are scaled length scales 18 while rack rim 13 to whose inward side. These measuring staffs are parallelly placed to be two pairs to engage with both two opposing sides of upper gear 5 and lower gear 3 and one pair perpendicularly cross the other pair (as FIG. 1 shows with 90 apart) to be pulled to set a bore center's abscissa and vertical coordinate. Each end of measuring staff 6 is provided with a direction-turnable rest plate 20 to contact the work object's basic plane when this device is in use. As we can see, measuring staff 6 is inserted in offering flute 21 of a U-support 22 of measuring staff bracket 7 that also comprises screw stem 23 and handlebar 24. For the reason that measuring staff bracket 7 is inserted in the guide groove 11 and fixed by nut piece 12, turning handlebar 24 to move the screw stem 23 forward can bring measuring staff 6, inserted in offering flute 21 of U-support 22 of measuring staff bracket 7, to displace, and thus can operate its rack to engage or separate from upper gear 5 or lower gear 3 in adjusting the length pulled out. Cover plate 8 is a circular plate with the same diameter as fixed support 4 (as FIG. 1 shows) and has a central opening to sheathe axle barrel 1 thereby. To make coverplate 8 unturned, there are provided a few convex points in the cover plate 8 lower surface to meet with the pits provided in the fixed support 4 surface. And there are provided vision holes 25 at proper places on cover plate 8 for observing central needles which point to the set length scales about measuring staffs 6. Lock nut 9 is screwed to the top of axle barrel 1 securely to pressure cover plate 8 to make measuring staff 6 impossible to move, but could allow adjustment given to measuring staff 6 if screwed loose.

In use, as this device is placed on a work object, it only requires to pull out one measuring staff 6 a length to set as bore center's abscissa dimension and another one set as bore center's vertical coordinate dimension and both lengths be locked and their ends of rest plates 20 touching work object's basic plane periphery, so the center of axle barrel 1 can be proved to be just the bore center position searched. By this way, any bore center position could be readily searched out and need not draw lines onto the work object surface. If in search of the central point or central line of a work object, it only requires to pull out a pair of measuring staffs 6 to make their rest plates 20 touching the work object's two side ends, so the center of axle barrel 1 then stands right on the central line searched and, also, could proves to be the central point of work object in case another pair is pulled out too to make their rest plates 20 touching work object's the other two side ends.

Figure 5:
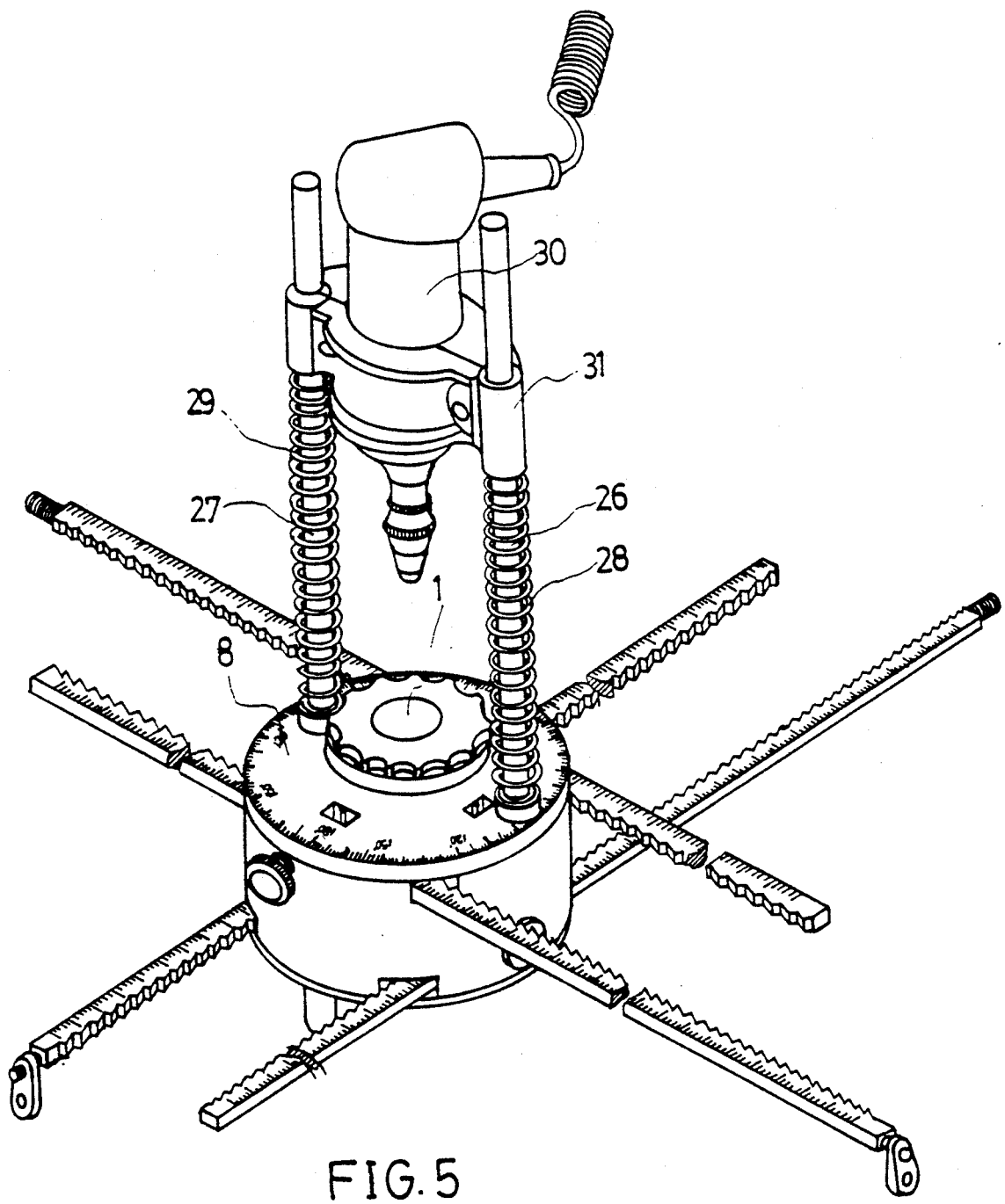
FIG. 5 shows on this invention's cover plate there could be built two fixed columns for bearing a driller which can facilitate boring right after definite bore center position uncovered.

As FIG. 5 shows, there could be built two fixed columns 26, 27 on cover plate 8, perpendicular to cover plate 8 and on a central line thereof, both of which are sheathed with a compression spring 28, 29 to connect with a fixed mount 31 bearing portable driller 30. Because driller 30 stands on the extended central line of axle barrel 1, it can be used readily to drill out any wished hole for user.

Figure 6:
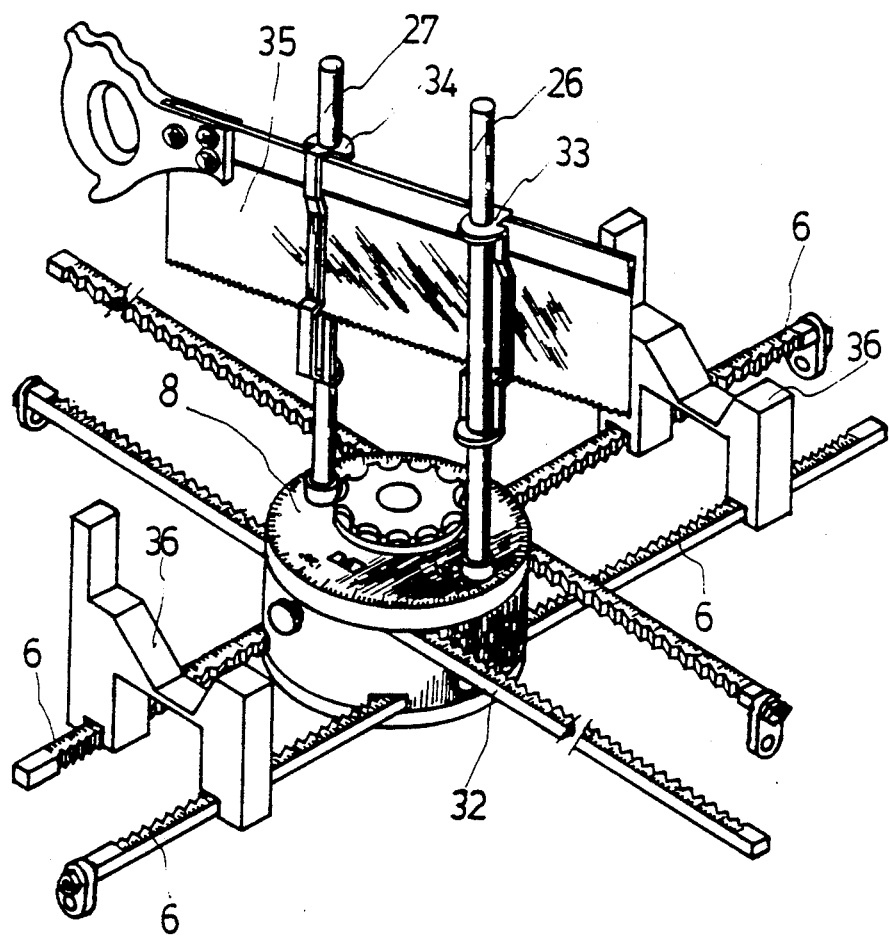
FIG. 6 shows the cover plate upper surface could be scaled with angle degrees and the two fixed columns could instead bear with a saw blade.

As FIG. 6 shows, the upper surface of cover plate 8 could be scaled with angle degrees 32, and these two fixed columns 26, 27 could be connected with saw-guide mounts 33 respectively which can bear saw blade 35 inserted therebetween. And there also could be two fixed blocks 36 set between a pair of measuring staffs 6 that give work object stablization (not shown in the drawing figures). So the work object could be sawed at any wished angle degree only if cover plate 8 is turned to that angle scale.

I claim:

1. A jig-boring device, comprising:
   a hollow circular axle barrel, a bottom plate having a central opening, a lower gear having an extended portion, a fixed support, an upper gear having an extended portion, a lock nut, two pairs of measuring staff brackets, two pairs of parallel measuring staffs;

said hollow circular axle barrel being perpendicular to the central opening of said bottom plate, and surrounded by said lower gear, said fixed support, and said upper gear, and having male threads at its top outer periphery to securely thread with said lock nut;

said bottom plate, comprising a circular plate with the central opening connected to said axle barrel and having a symmetry of guide grooves as well as cross nut pieces in its upper area where one of said pair measuring staff brackets is connected thereby and is guided in its moving back or forth;

said lower gear, having a central opening surrounding said axle barrel, having its extended portion in its upper area to insert said fixed support above to get positioned thereby;

said fixed support, comprising a short cylindric block, fixed between said lower gear and said upper gear, and having a central opening surrounding said axle barrel, said support having a concave portion in its central upper and lower areas which corresponds to the extended portion of the lower gear and upper gear for them to insert, and having a symmetry of guide grooves and cross nut pieces in the upper area outside said concave portion where the other of said pair of measuring staffs make connection thereto;

an upper gear, which has all the same structure as said lower gear but having said extended portion in its lower area to insert into said fixed portion;

each of said measuring staffs comprising a longitudinal rack having a rectilinear shape, each staff having an upper outward face scaled with length scales while the upper inward face is a longitudinal rack rim, and said pairs of staffs are placed parallel beside the opposing two sides of said lower gear and upper gear, one pair perpendicularly crossing the other pair, and each staff having direction-turntable rest plates at an end for touching with a basic plane when in use;

said two pairs of measuring staff brackets comprising a U-support, a screw stem and a handlebar, connected to the symmetry of guide grooves and cross nut pieces provided in the upper areas of said bottom plate and fixed support respectively, so as to guide each said pair of measuring staffs inserted in their U-supports in their movement;

a cover plate, which by means of a central opening therein surrounds said axle barrel and is above the top of said fixed support;

said lock nut, screws to the male threads of the top outer periphery of said axle barrel; and wherein said device measures bore center position on work objects.

2. A jig-boring device as recited in claim 1, wherein two fixed columns are built perpendicularly on said cover plate, standing on a central line thereof, and each surrounded with a compression spring for supporting a fixed mount sheathing the two fixed columns to which a driller is connected with its central line aiming the center of said axle barrel.

3. A jig-boring device as recited in claim 1, wherein angle degrees are scaled on said cover plate upper surface and two fixed columns are sheathed with guide-saw mounts between which a hand saw blade are inserted to saw work objects at any pre-set angles.

* * * * *